3,213,108
PROCESS FOR MAKING ETHYLENE SULFIDE
AND INTERMEDIATE PRODUCT FOR USE
THEREIN
Stephen W. Osborn, Yardley, and Edward Broderick, Perkasie, Pa., assignors to Thiokol Chemical Corporation, Bristol, Pa., a corporation of Delaware
No Drawing. Filed Aug. 9, 1962, Ser. No. 215,794
11 Claims. (Cl. 260—327)

The present invention relates to a novel process for the preparation of ethylene sulfide, as well as to a novel composition of matter, specifically polymeric ethylene monothiocarbonate, which is useful as an intermediate in the production of ethylene sulfide.

Ethylene sulfide is a compound that is useful both as such and as an intermediate in the production of other compounds. Thus it has been used as the active ingredient in various insecticides, fungicides and the like for the extermination of insect pests and fungus growths. It polymerizes readily to form polymers having useful properties as plastics. In addition it has been proposed as a starting material in numerous syntheses described in the chemical literature.

Because of its tendency to polymerize, ethylene sulfide is somewhat unstable in storage. Hence efforts have been made to find an intermediate in the production of ethylene sulfide which is stable in storage and which is capable of being economically, easily and quickly converted to ethylene sulgde as needed. For example, U.S. Patent 2,828,318 discloses a process wherein phosgene and mercaptoethanol are reacted to form an ethylene thiocarbonate which can be stored until it is desired to generate ethylene sulfide. Upon heating the carbonate, a mixture of ethylene sulfide and carbon dioxide is evolved from which the ethylene sulfide can be readily condensed and collected.

While this process provides a stable source of ethylene sulfide, it is open to the objection that both phosgene and mercaptoethanol are relatively expensive materials. Hence a need exists for a more economical process for making a stable intermediate useful as a source of ethylene sulfide.

It is accordingly an object of the present invention to provide an improved process for making ethylene sulfide. It is another object of the invention to provide a novel intermediate compound in the production of ethylene sulfide, which intermediate is inexpensive to make and stable in storage, and from which intermediate ethylene sulfide can be readily produced in a commercially feasible manner. Other objects of the invention will be in part obvious and in part pointed out hereafter.

The present invention is based on the finding that ethylene sulfide can be prepared in good yield from a polymeric ethylene thiocarbonate which can itself be readily made by the reaction of carbonyl sulfide with ethylene oxide under the conditions described herein. It has been found that the ethylene thiocarbonate polymer of the present invention is stable in storage and upon heating to moderately elevated temperatures, either with or without a catalyst, yields a mixture of ethylene sulfide and carbon dioxide from which ethylene sulfide can be readily recovered.

In preparing the ethylene thiocarbonate polymer according to the invention, ethylene oxide and carbonyl sulfide are reacted in the presence of a suitable catalyst at a temperature between 25° C. and the melting point of the polymer, which is about 85° C. The preferred temperature range is 25° to 65° C. Because of the volatility of the reactants and the desirability of maintaining the reactants largely in the liquid phase, the reaction is advantageously conducted in a closed reactor at elevated pressures. Ordinarily the autogenous pressure in the reactor is used. However, if a higher pressure is desired, an inert gas such as nitrogen can be introduced into the reactor, or if a lower pressure is desired, the reaction can be carried out in the presence of an inert solvent of relatively low volatility such as tetrahydrofuran. The pressure used does not appear to be particularly critical. The reaction ordinarily proceeds to completeness in a period of 4 to 18 hours depending upon the reaction conditions, the proportions of reactants and the catalyst used. In special cases longer or shorter reaction times may be found desirable.

The carbonyl sulfide and ethylene oxide react in equimolar ratio to produce an ethylene monothiocarbonate polymer according to the following equation:

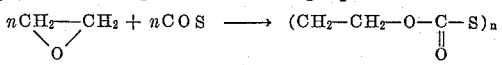

In this equation "$n$" is an integer which is 4 or greater. In the preferred form of polymer "$n$" is about 30 and the molecular weight of the polymer is about 3000. The melting point of the polymer ranges from about 85° to 115° C. depending upon its degree of polymerization, and it has a theoretical sulfur content of 30.77%.

While the carbonyl sulfide and ethylene oxide react in equimolar proportions, it is desirable that an excess of carbonyl sulfide be used in order to drive the reaction to completeness. Excess carbonyl sulfide also acts as a solvent or cosolvent for the reaction system. The preferred molar ratio of carbonyl sulfide to ethylene oxide is from 1:1 to 2:1.

It is important that the reactants, as well as any inert gases or solvents used, be as free as possible from impurities, e.g., hydrogen sulfide, water and carbon dioxide, if optimum yields are to be achieved. No more than trace amounts of these impurities should be present in the reaction system. If more than 1% of such impurities are present, the yield of polymer is appreciably lowered.

As indicated above, the polymerization reaction of the present invention is carried out in the presence of a catalyst. Suitable catalysts include strongly basic compounds such as sodium hydroxide, potassium hydroxide, lithium hydroxide, the methoxides, ethoxides, isopropoxides, and tertiary butoxides of sodium, potassium and lithium, tetra alkyl ammonium hydroxides or methoxides and trimethyl-beta-hydroxyethyl ammonium hydroxide. The preferred catalyst is sodium methoxide. The suitable catalysts may be defined as compounds having a basicity at least substantially as great as that of sodium methoxide and which ionize in aqueous solution to form the anion OH or OR wherein "R" is an alkyl, preferably a lower alkyl, group. The catalyst may be used in an amount equal to from 0.5 to 5% based on the weight of ethylene oxide charged.

Because of the tendency of ethylene oxide to polymerize in the presence of strongly basic compounds of the type here used as catalysts, the order in which the reactants are charged to the reactor is of some importance. More particularly the ethylene oxide should desirably be added after the carbonyl sulfide, catalyst and solvent, if used, have been introduced into the reactor.

To produce ethylene sulfide from the polymeric ethylene monothiocarbonate, the polymer is heated at a temperature of 60° to 200° C., preferably 100° to 170° C., whereupon it decomposes according to the following equation:

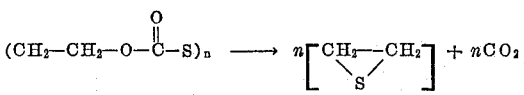

The ethylene sulfide is condensed from the carbon dioxide gas which is vented to the atmosphere or otherwise disposed of. The yield of ethylene sulfide can be improved by employing a basic catalyst, e.g., potassium carbonate, in the polymer decomposition reaction. The ethylene sulfide produced is of high purity, and yields of at least as high as 70% based on the amount of ethylene monothiocarbonate polymer can be achieved.

In order to point out more fully the nature of the present invention, the following specific examples are given of illustrative methods of making ethylene monothiocarbonate polymer and ethylene sulfide according to the invention.

Example 1

A pressure reactor was charged with 1 gram of sodium methoxide, 81 grams (1.35 mols) of carbonyl sulfide, and 44 grams (1.0 mol) of ethylene oxide. The sodium methoxide was introduced into the reactor, and then the carbonyl sulfide in gaseous form was charged thereto. Thereafter the ethylene oxide in liquid form was added. When charging of the reactor had been completed, the reactants were at a temperature of 29° C., and the reactor pressure was 180 p.s.i.g.

The reaction mixture was agitated for about 16 hours at room temperature and then allowed to stand over a weekend, also at room temperature. At the end of this period the reactor pressure was 220 p.s.i.g. The reactor was vented and opened and 63 grams of a crude solid product removed therefrom. The crude product was washed with ether to yield 52.7 grams of a white solid ethylene monothiocarbonate polymer. The polymer produced had a melting range of 92° to 95° C. and a sulfur content of 30.94% by weight as compared with a theoretical sulfur content of 30.77% calculated for ethylene monothiocarbonate polymer.

4 grams of the ethylene monothiocarbonate polymer product was placed in a 50-ml. round-bottom flask with 0.1 gram of potassium carbonate. A delivery tube connected the flask to a receiver in a Dry Ice bath. The monothiocarbonate polymer containing the potassium carbonate was heated to 170° C. using an oil bath. The distillate collected was shown to be ethylene sulfide by chromatographic comparison with pure ethylene sulfide. The chromatograms were substantially identical.

Example 2

A reactor was charged with 100 ml. of tetrahydrofuran and 1 gram of sodium methoxide. The reactor was closed and 91 grams of gaseous carbonyl sulfide charged thereto under pressure. Then 44 grams of liquid ethylene oxide was added. Upon completion of the charging operation, the reactor pressure was 50 p.s.i.g. The reaction mixture was agitated at ambient temperatures (25° to 27° C.) for several days, at the end of which time the reactor was opened and the reaction products removed therefrom.

The reaction mixture was filtered to recover the solid products therein, and the solid material washed with diethyl ether, methanol and then again with ether. The washed material was dried in a vacuum oven at ambient temperatures to produce 54.4 grams of white solid ethylene monothiocarbonate polymer in particulate form. The polymer had a melting range of 85° to 87° C. and a sulfur content of 30.8%. Upon heating this polymer in the presence of potassium carbonate, good yields of ethylene sulfide are obtained.

Example 3

A reactor was charged with 2 grams of sodium methoxide, 113 grams of carbonyl sulfide and 44 grams of ethylene oxide. The reaction mixture was stirred for several days under autogenous pressure, at the end of which time the reactor was vented to relieve excess pressure and the reaction products removed therefrom. 80.1 grams of a light yellow solid product were obtained which was then washed once with ether, three times with cold water, once with methanol, and finally again with ether. The washed product was vacuum dried at ambient temperature to give a white solid ethylene monothiocarbonate polymer in 75-gram yield. The polymer melted within the range 106° to 111° C. and had a sulfur content of 28.67%.

Example 4

A reactor was charged with 1 gram of sodium methoxide, 178 grams of carbonyl sulfide and 44 grams of ethylene oxide. The contents of the reactor were agitated for a period of 17 hours at ambient temperatures of 23° to 32° C. During the polymerization reaction the reactor pressure fell from 190 to 145 p.s.i.g. and then rose to 215 p.s.i.g. At the end of the 17-hour reaction period, the reactor was opened and 38.3 grams of light yellow fluffy powder removed therefrom.

The crude product thus obtained was washed with diethyl ether, methanol and then again with ether. It was vacuum dried at room temperature to yield 32.8 grams of ethylene monothiocarbonate polymer in the form of a white powder. The polymer had a melting range of 92° to 95° C. and a sulfur content of 30.4%.

Example 5

A reactor was charged with 2 grams of sodium methoxide, 102 grams of carbonyl sulfide and 44 grams of ethylene oxide. The contents of the reactor were agitated under autogenous pressure over a 17.5-hour period at temperatures of 24° to 35° C. During the reaction period the reactor pressure dropped from 200 to 170 p.s.i.g. and then rose to 200 p.s.i.g. At the end of the reaction period, the reactor was opened and 59 grams of a light yellow solid removed therefrom. The crude product was washed with ether, three times with water, then with methanol, and finally again with ether, after which it was vacuum dried at ambient temperatures. 43.3 grams of ethylene monothiocarbonate polymer in the form of a white powder was obtained. The polymer had a melting point range of 103° to 110° C. and a sulfur content of 29.8%.

Example 6

A reactor was charged with 1 gram of sodium methoxide, 146 grams (2.43 mols) of carbonyl sulfide, and 44 grams of ethylene oxide. Upon completion of the charging of the reactor, the reactants were at 25° C. and the reactor pressure was 200 p.s.i.g.

The reaction mixture was agitated for about sixteen hours at room temperature and then allowed to stand overnight. The reactor was then vented, opened and 53.5 grams of the light yellow powder removed therefrom. The yellow powder removed from the reactor was washed three times with water, and then dried in a vacuum oven to yield 47.2 grams of ethylene monothiocarbonate polymer. The polymer thus produced had a melting range of 98° to 103° C. and a sulfur content of 28.89% by weight.

A test tube equipped with a delivery tube, nitrogen flow tube, and a fumes tube leading to a flask in a Dry Ice bath was partially submerged in an oil bath at 230° C. 1 gram of potassium carbonate was introduced into the test tube and monothiocarbonate polymer produced as described above was introduced into the test tube through the delivery tube until 10 grams of the polymer had been added. After two hours 4 grams (70% yield) of liquid ethylene sulfide had collected in the flask. The ethylene sulfide obtained had a purity of 98.25%.

It is of course to be understood that the foregoing examples are illustrative only and that numerous changes can be made in the ingredients, proportions and conditions set forth therein without departing from the spirit of the invention as set forth in the appended claims.

We claim:
1. Poly(ethylenemonothiocarbonate) of the formula

$$(CH_2-CH_2-O-\underset{\underset{O}{\|}}{C}-S)_n$$

wherein "$n$" is an integer that is at least 4, said polymer having a melting point within the range 85° to 115° C.

2. Poly(ethylenemonothiocarbonate) having a molecular weight of about 3,000 and a melting point of about 85° C.

3. A method of making poly(ethylenemonothiocarbonate) which comprises reacting carbonyl sulfide with ethylene oxide in the presence of an ionizable catalyst at a temperature of 25° to 85° C. to form said polymer, said catalyst having a basicity at least substantially as great as that of sodium methoxide and being ionizable to form an anion selected from the group consisting of OH and OR wherein "R" is a lower alkyl radical, and recovering said polymer from the reaction product.

4. A method according to claim 3 and wherein the reaction is carried out in an inert solvent.

5. A method according to claim 3 and wherein the carbonyl sulfide and ethylene oxide are in a molar ratio of from 1:1 to 2:1.

6. A method according to claim 3 and wherein the reaction is carried out under autogenous pressure.

7. A method of making poly(ethylenemonothiocarbonate) which comprises reacting carbonyl sulfide with ethylene oxide in a molar ratio of from 1:1 to 2:1 in the presence of sodium methoxide as a catalyst under autogenous pressure at a temperature of 25° to 85° C. to form said polymer, and recovering said polymer from the reaction products.

8. A method of making ethylene sulfide which comprises reacting carbonyl sulfide with ethylene oxide in the presence of an ionizable catalyst at a temperature of 25° to 85° C. to form poly(ethylenemonothiocarbonate), said catalyst having a basicity at least substantially as great as that of sodium methoxide and being ionizable to form an anion selected from the group consisting of OH and OR wherein "R" is a lower alkyl radical, separating the ethylene monothiocarbonate polymer from the reaction products, heating the polymer to evolve ethylene sulfide therefrom, and collecting the thus-formed ethylene sulfide.

9. A method of making ethylene sulfide which comprises heating poly(ethylenemonothiocorbonate) to evolve ethylene sulfide therefrom, and collecting the evolved ethylene sulfide.

10. A method according to claim 9 and wherein the poly(ethylenemonothiocarbonate) is heated at a temperature of 60° to 200° C. in the presence of a basic catalyst.

11. A method according to claim 10 and wherein the catalyst is potassium carbonate.

References Cited by the Examiner

UNITED STATES PATENTS

| 2,828,318 | 3/58 | Reynolds | 260—327 |
| 3,073,846 | 1/63 | Millikan | 260—327 |

OTHER REFERENCES

Durden et al.: J. Org. Chem., volume 26 (March 1961), pages 836–839.

WALTER A. MODANCE, *Primary Examiner.*

NICHOLAS S. RIZZO, *Examiner.*